United States Patent [19]

Twigg et al.

[11] Patent Number: 4,863,712

[45] Date of Patent: Sep. 5, 1989

[54] CATALYSTS FOR REFORMING HYDROCARBON FEEDSTOCKS

[75] Inventors: Martyn V. Twigg, Yarm; William M. Sengelow, Billingham, both of England

[73] Assignee: Imperial Chemical Industries PLC, London, England

[21] Appl. No.: 292,002

[22] Filed: Dec. 30, 1988

Related U.S. Application Data

[62] Division of Ser. No. 90,341, Aug. 28, 1987, Pat. No. 4,810,685.

[30] Foreign Application Priority Data

Sep. 10, 1986 [GB] United Kingdom ................. 8621792
Mar. 3, 1987 [GB] United Kingdom ................. 8704947

[51] Int. Cl.$^4$ ............................................. C01B 3/38
[52] U.S. Cl. ..................................... 423/651; 252/373; 252/376; 423/415 A; 423/652; 423/653; 423/654
[58] Field of Search .............................. 252/373, 376; 423/415 A, 651, 652, 653, 654

[56] References Cited

U.S. PATENT DOCUMENTS

| | | | |
|---|---|---|---|
| 4,024,212 | 5/1977 | Dore et al. | |
| 4,256,609 | 3/1981 | Dale | 502/60 |
| 4,257,810 | 3/1981 | Narumiya | |
| 4,308,233 | 12/1981 | Narumiya et al. | |
| 4,560,478 | 12/1985 | Narumiya | |
| 4,689,316 | 8/1987 | Bowman | 502/60 |
| 4,707,351 | 11/1987 | Lord et al. | 423/654 |

Primary Examiner—John Doll
Assistant Examiner—Wayne A. Langel
Attorney, Agent, or Firm—Cushman, Darby & Cushman

[57] ABSTRACT

A catalyst, or a precursor thereto, comprises, as the active material or as a support therefor, a ceramic foam having a network of irregular passages extending therethrough, said passages having an average minimum dimension in the range 20 to 300 $\mu$m, said foam having a total porosity in the range 40 to 85% and an apparent density of at least 0.7 g. cm-3. The foam may be made by forming a negative replica of an open cell plastics foam by impregnation of the latter with a dispersion of the ceramic material, followed by drying and calcining the impregnated foam to remove the plastics material and to cause the ceramic material to sinter.

For a steam reforming catalyst the ceramic may be alpha alumina and the active material nickel and/or cobalt.

10 Claims, No Drawings

CATALYSTS FOR REFORMING HYDROCARBON FEEDSTOCKS

This is a division of application Ser. No. 090,341 filed Aug. 28, 1987, now U.S. Pat. No. 4,810,685.

This invention relates to catalysts and in particular to catalyst pieces comprising a catalytically active material or a precursor thereto. By the term "catalyst" we include not only materials that catalyse chemical reactions but also materials, such as zinc oxide or zeolites, used as absorbents or adsorbents and which in some cases may react, possibly irreversibly, with components, eg impurities, of a fluid stream passed through a bed of the catalyst pieces.

For a process that is not diffusion limited, the catalytic activity depends on the surface area of active material in a bed of the catalyst. For a diffusion limited process, the activity is increased by increasing the geometric surface area per unit volume of the catalyst, or precursor, pieces from which the bed is formed. While decreasing the size of the pieces has the effect of increasing the geometric surface area per unit volume of the pieces, it has the adverse effect of increasing the pressure drop resulting from the flow of reactants, which are generally gaseous (although in some cases liquid reactants may be employed), through the bed; usually it is desirable to to minimise this pressure drop. Also catalytic reactions generally involve the absorption or evolution of heat; the geometric shape often affects the transfer of heat, to or from, the reactants, Further the ease of access of the reactants to and from the active material sites also may have a significant effect.

With catalysts made by co-precipitation of the active material or a precursor thereto, optionally together with other components such as stabilising oxidic materials, the geometric shapes of the catalyst pieces have generally been relatively simple; for example the compositions may be pelleted, compacted, or extruded and cut, into shapes such as squat cyliners. Where a performed support is used, which is subsequently coated or impregnated with the active material or precursor thereto (and also, in some cases with a stabilising material), the support may be in a more complex shape such as cylinders having one or more axial passages, hollow cylinders with partitions, eg spoked "wagon wheels", saddles, monoliths, and honeycombs, which give desirable pressure drop and heat transfer characteristics and also a reasonably high geometric surface area, and hence, after impregnation or coating, and activation, eg reduction, if necessary, a reasonably high surface area of active material per unit catalyst bed volume. However difficulties are often encountered in producing supports in such complex shapes.

In the present invention the support is in the form of pieces having a particular open foam structure.

It has been proposed in GB-A-1349400 to produce porous support materials in relatively complex shapes by shaping a polyolefin composition containing a ceramic filler, burning out the polyolefin, and then firing to cause the residual ceramic material to a self-supporting ceramic body.

In the present invention a somewhat different approach is adopted which enables relatively complex geometric shapes to be readily made, if desired, and which leads to a structure having a significantly greater porosity and hence improved access of the reactants to the active material impregnated into the support. The increased porosity enables there to be convection through the catalyst piece rather than merely slow diffusion of the reactants and products into and out of the catalyst pieces.

It has been proposed in GB-A-2070957 to employ a ceramic foam as a support for a catalytically active material. Ceramic foams have heretofore been made by impregnating an open cell foam of an organic plastics material, such as a polyurethane, with a relatively low viscosity aqueous slurry of a ceramic material, such as alumina, removing the excess of the slurry by blowing air through the impregnated foam or by compressing the foam in one or more stages, as described for example in GB-A-1537549 and GB-A-2027688, drying, and then calcining to remove the organic material and to cause the ceramic particles to sinter. In such processes the ceramic material forms a coating on the organic plastics foam so that, on removal of the organic material in the calcining step, the resultant ceramic foam is virtually a ceramic copy of the plastic film skeleton, except that the filaments thereof often having a hollow "core". Such ceramic foams are characterised by a relatively low bulk density and a high voidage; the latter is typically 70 to 95% of the volume of the ceramic foam unit.

While such ceramic foams may be satisfactory as catalyst supports for some applications, eg exhaust gas cleaning, for most catalytic applications involving the use of a random packed bed of units of the ceramic foam bearing a coating of the active material, as a consequence of the low bulk density and high voidage of the foam, the amount of active material in a given catalyst bed volume is generally inadequate. Also often the ceramic foams lack the mechanical strength necessary to withstand the crushing forces imposed in a catalyst bed of the volume normally encountered in large scale catalytic processes.

We have devised alternative ceramic foam supports. In the present invention the supports may be made as described above except that the impregnation of the organic plastics foam is conducted so as to ensure that the pores of the foam are substantially filled with a slurry that is relatively viscous and thixotropic so that, on drying, the ceramic material remains in the pores of the foam: upon calcining the plastics material is burnt out so that the resultant structure is a "negative" of the original plastic foam: thus there is no compression of the foam, or air blast therethrough, to expel slurry from the plastics foam. In contrast to the foams of the aforesaid references where the ceramic material merely forms a coating on the walls of the foam, so that, upon removal of the plastics material, the passages through the ceramic foam essentially correspond to the passages in the original plastics foam, in the present invention the passageways through the ceramic foam unit correspond to the plastics material of the plastics foam rather than the pores thereof. The ceramic foam units of the invention are characterized by a small average pore size, a relatively high bulk density, and a lower total porosity compared with the foams made according to the aforesaid references.

Accordingly the present invention provides a catalyst, or a precursor thereto, comprising a ceramic material comprising, or supporting, the active catalyst or a material convertible thereto, wherein the ceramic material is a foam having a network of irregular passageway extending therethrough, said passages having an average minimum dimension in the range 20 to 300 $\mu$m, said foam having a total porosity in the range 40 to 85% and an apparent density of at least 0.7 g.cm$^{-3}$.

The apparent density of the ceramic foam, ie the density as determined by measurement of the external dimensions and the weight, is preferably below 5 g.cm$^{-3}$, and in particular is in the range 1 to 2.5 g.cm$^{-3}$. Where the pieces of the ceramic foam are of an irregular shape, eg granules obtained by fragmentation, so that their volume is not readily determined by measuring the external dimensions of the pieces, the apparent density may be determined from the weight of the pieces and the bulk density of a bed of the pieces assuming a packing fraction appropriate to pieces of that shape and size distribution. Alternatively it may be appropriate to assume that the pieces approximate to a geometric shape whose volume can be calculated from the dimensions. Alternatively the volume may be determined by filling at least the outer poes of the ceramic foam with a suitable material, eg wax, and determining the volume by displacement of a suitable fluid.

The ceramic foams employed in the present invention preferably have a total pore volume of less than 2 cm$^3$.g$^{-1}$, and particularly in the range 0.2 to 1.5 cm$^3$.g$^{-1}$, and most preferably in the range 0.2 to 0.8 cm$^3$.g$^{-1}$. By the term total pore volume of the foam as determined by its external dimensions less the volume occupied by the ceramic material itself. The latter may be determined by measuring the helium density. The total pore volume is the difference between the reciprocal of the helium density and the reciprocal of the apparent density. In the ceramic foams of the present invention, part of the total pore volume is in the form of relatively large pores, herein termed megapores, whereas the remainder is in the form of pores of sizes normally encountered in ceramic catalyst supports. Conventionally the pore volume of a ceramic catalyst support is determined from measurement of the density in mercury and the density in helium (both measured at atmospheric pressure). In the foams employed in the present invention the pore volume determined in this way, ie the difference between the reciprocal of the mercury density and the reciprocal of the helium density, is termed the micropore volume, and is typically in the range 0.02 to 0.3 cm$^3$.g$^{-1}$. It will be appreciated that the apparent density, total pore volume and micropore volume, will of course depend to some extent on the nature of the ceramic material.

The total porosity, which is the product of the total pore volume and the apparent density, and is expressed as a percentage, of the ceramic foams employed in the present invention is in the range 40 to 85%, preferably 50 to 80%, and is generally less than materials made by the aforesaid methods involving removal of ceramic dispersion from the impregnated foam by squeezing or by means of an air blast. Foams made by that method generally have a total porosity above about 85%, a total pore volume above about 1.6 cm$^3$.g$^{-1}$ and an apparent density below 0.6 g.cm$^{-3}$. From measurement of the mercury density as aforesaid, it is also possible to determine a megaporosity, ie the proportion of the overall volume that is in the form of the megapores and hence the ratio of the megaporosity to the total porosity. The megaporosity is the ratio of the difference between the mercury density and the apparent density to the mercury density. The ratio (expressed as a percentage) of the megaporosity to the total porosity is typically in the range 60 to 90%, whereas the materials made as aforesaid by methods involving removal of ceramic material from the impregnated foam by squeezing or by means of an air blast, typically have a megaporosity/total porosity ratio of well above 90%, often about 95% or more.

The surface area of the ceramic foam, as measured by the BET method using nitrogen, is preferably in the range 0.1 to 10 m$^2$g.$^{-1}$.

As indicated above, the ceramic foam catalyst or support may be made using an open cell organic plastics foam; particularly suitable foams are flexible open-cell polyurethane foams, preferably those having more than 5 pores per linear cm. The catalyst, or support, is generally required in a particular geometric shape. The plastics foam may be cut and machined, eg stamped, from a sheet or block into the desired external shape of the support pieces. Alternatively plastics foam pieces having the desired external shape of the desired pieces may be produced directly in the fabrication process, eg casting, moulding, or extrusion, employed in the production of the plastics foam. In another alternative a sheet, rope, or block of the plastics foam may be impregnated with the slurry of the ceramic material and after drying, but before calcining and sintering, machined to the desired shape. Since some shrinkage will generally occur during the calcination and sintering stages, the plastics foam pieces will generally be somewhat larger than the desired sintered ceramic foam pieces. For some applications a catalyst, or support, in the form of irregular shapes, eg granules, is reqired. In this case the plastics foam may be ground to the desired size prior to impregnation. Alternatively the dried impregnated foam, or the ceramic foam produced by the calcination of the dried impregnated foam, may be fragmented.

The ceramic material used in the slurry will depend on the intended use of the catalyst. Thus silica-free materials, ie containing less than 0.5% by weight of silica, eg alumina (generally in the alpha form) or calcium aluminate cement are particularly suitable where the catalyst is for steam reforming. Silica-containing materials however can often be employed for other applications. Other materials that can be employed include magnesia, rare earths, zirconia, and titania. Mixtures of ceramic materials can be employed. The ceramic material should have a particle size such that it can readily be dispersed in the carrier liquid, which is conveniently water, of the slurry, and penetrate into the air spaces in the plastics foam. Generally ceramic particles having a size in the range 0.1 to 10 μm are suitable. The slurry typically contains at least 20% by weight of the ceramic material and in particular from 30 to 80% by weight. Additives such as wetting agents, dispersion stabilisers such as polyvinyl alcohol, and viscosity modifiers may usefully be incorporated into the slurry. The slurry employed is preferably thixotropic, having a relatively high viscosity, preferably above 1000 cp, particularly above 1500 cp, under low shear and a relatively low viscosity, preferably below 500 cp, particularly below 300 cp, under high shear conditions. In this context, the viscosity of the dispersion may be measured, at room temperature, using a Haake Rotovisco rotating vane viscometer using a shear rate of 24 sec$^{-1}$ for the low shear conditions and a shear ratio of 441 sec$^{-1}$ for the high shear conditions. In order to obtain a reliable indication of the thixotropic nature of the dispersion, the viscometer should be run for a period of 5 minutes at the high shear rate before taking the measurement.

The impregnation of the plastics foam is conveniently effected by immersing the plastics foam in the slurry, while the latter is sheared to reduce its viscosity, and displacing air from the foam, eg by squeezing or vibrating the foam while so immersed.

The impregnated foam is then removed from the slurry bath and dried. It is often desirable, in order to avoid the formation of a skin of the ceramic on the surface of the impregnated plastics foam, to blot the surface of the impregnated foam with an absorbent material; alternatively the excess of slurry on the surface of the foam may simply be allowed to drain away. In contrast to the aforementioned techniques producing a ceramic foam structure that is a positive replica of the foam, no compression of the impregnated foam or passage of an air blast through the foam is employed after impregnation. Drying of the foam is usually effected at a temperature below 100° C. and may be effected under controlled humidity conditions.

The plastics material is then removed from the impregnated foam by heating in air; this heating may be part of the calcination step causing the ceramic particles to sinter.

Generally calcination temperatures above 1000° C. are required to cause the ceramic particles to sinter to give a product having adequate mechanical strength. However removal of the organic material can generally be effected at significantly lower temperatures, eg 400° to 600° C. The temperature required for sintering will depend on the nature of the ceramic material, the required BET surface area of the support and the desired mechanical strength. For alpha alumina ceramic foams the calcination temperature is preferably in the range 1300° to 1450° C.

In a preferred process, a polyurethane foam "rope" is continuously passed through a bath containing the aqueous dispersion of the ceramic material eg alpha alumina, passed through the nip between a pair of rollers in the bath so as to expel air, and allowed to drain, before drying and calcining. The rope is cut into suitable size lengths before or after drying but preferably before calcination. The "rope" may be of any suitable cross section, eg circular, square, or hexagonal, and should be somewhat larger than the desired cross section of the catalyst particles in order to allow for shrinkage occurring during the calcination/sintering stage. Typically the degree of volume shrinkage occurring during the calcination/sintering stage is in the range 20 to 60%. The overall dimensions of the ceramic foam pieces are preferably in the range 2 to 20 mm.

By this technique it is possible to form macro-porous alpha alumina shapes of considerable strength. A typical product has the following characteristics:

BET Surface area: 0.1 $m^2.g^{-1}$
Helium density: 3.97 $g.cm^{-3}$
Mercury density: 3.05 $g.cm^{-3}$
Apparent density: 1.35 $g.cm^{-3}$
Total pore volume: 0.49 $cm^3.g^{-1}$
Micropore volume: 0.08 $cm^3.g^{-1}$
Total porosity: 66%
Megaporosity: 56%

After sintering the ceramic foam pieces are impregnated with the active material, or a precursor thereto, ie a material that is convertible to the active material by heating and/or oxidation or reduction, optionally together with other materials, eg stabilisers or precursors thereto. For example for forming a catalyst precursor for use in steam reforming processes, the support material is usually impregnated with nickel and/or cobalt compound eg a salt such as the nitrate, optionally together with a salt, eg aluminium nitrate, that decomposes to give a stabilising oxide. On heating, the nitrates decompose to the respective oxides and on subsequent reduction in a hydrogen-containing gas stream (which reduction is normally performed in the steam reformer) the nickel and/or cobalt oxides are reduced to the active metal.

The sintered ceramic foam pieces may be impregnated more than once if desired in order to achieve a desired loading of the active material or precursor thereto. Preferably the impregnated support is calcined, eg at 350° to 750° C., to decompose metal compounds to oxides between impregnations.

Since the ceramic foam support is generally sintered, in order to provide the desired mechanical strength, to such an extent that it has a low BET surface area, the ceramic foam itself will generally not exert any significant stabilising effect to prevent sintering of the active material, where the latter is a metal, during use. For this reason it is strongly preferred to incorporate a stabiliser, or precursor thereto, in the medium used for impregnating the support with the active material or precursor thereto. Alternatively the support may be impregnated alternately with the active material, or precursor thereto, and with the stabiliser or precursor thereto. The stabiliser may be chemically similar to the ceramic support: for example the support may be an alpha alumina foam and the stabiliser may also be alumina. However the stabiliser is not calcined to such an extent as the ceramic foam and can generally be separated from the ceramic foam by leaching with a suitable leachant, eg, in the case of alumina, with sulphuric acid.

Where the active catalyst is a metal and is produced by reducing a precursor comprising a reducible metal compound, it is preferred that the amount of stabiliser is 10 to 50% by weight of the reducible metal compound in order to provide the optimum combination of good catalytic activity and lon catalyst life.

The invention is particularly suited to the production of precursors for reforming catalysts. In such a reforming process a hydrocarbon feedstock, such as methane, natural gas, LPG, or naphtha, is reacted with steam and/or carbon dioxide in the presence of a supported nickel and/or cobalt catalyst, with the heat required for the endothermic reaction being supplied from the sensible heat of the reactants or from an external heat source. The reforming is preferably effected at a pressure in the range 1 to 50 bar abs. and at a reformer outlet temperature in the range 700° to 900° C., or even higher, eg up to 1100° C., particularly where the reforming process is employed to produce hydrogen for use in iron ore reduction, or where the reforming process follows partial combustion with an oxygen-containing gas, eg air, as in "secondary reforming" as employed in the production of ammonia synthesis gas. The reaction is preferably performed in the presence of an excess of steam and/or carbon dioxide. Preferred amounts of steam are 1.5 to 6, particularly 2.0 to 5, g mols of steam per g atom of carbon in the feedstock.

The invention is also of use in other catalytic processes such as:

methanation, which generally involves the use of a supported nickel and/or cobalt catalyst;

hydrodesulphurisation, generally involving a mixture of cobalt and molybdenum oxides and/or sulphides as the active catalyst—such materials are also effective as catalysts for hydrocracking hydrocarbons such as fuel oils into shorter chain hydrocarbons;

catalytic combustion, wherein the active catalyst is generally a noble metal such as platinum, often in admixture with nickel—particular uses for such combustion catalysts are in space heaters and in hair curlers;

ethylene oxidation, wherein the active material is generally silver;

xylene oxidation, wherein the active material is generally vanadium pentoxide;

sulphur dioxide oxidation to sulphur trioxide, wherein the active catalyst is vanadium pentoxide;

hypochlorite decomposition, where the active catalyst is usually supported nickel, cobalt and or copper—in this case the reactants are usually in the form of an aqueous solution.

Another application of the materials of the present invention is in the removal of carbon particles from gas streams, eg in automobile exhaust gas cleaning. Thus the porous ceramic foam may be used to filter the carbon particles from the gas stream and to facilitate their low temperature combustion to carbon dioxide. For this application alkali, and alkaline earth, metal oxides are active materials, particularly oxides of sodium, potassium, and barium. The catalyst may be made by impregnating the ceramic foam with one or more suitable precursors to such alkali materials eg alkali or alkaline earth nitrates or alkali metal hydroxides or carbonates. For this application the ceramic foam is preferably alumina, particularly alkalised alumina prepared by the incorporation of one or more alkali, or alkaline earth, metal compounds decomposable to the corresponding oxide, into the dispersion or impregnated plastics foam, prior to sintering. The alkali, or alkaline earth, metal oxide impregnant of the resultant catalyst may also catalyse the removal of nitrogen oxides via formation of alkali (or alkaline earth) nitrate that in turn oxidises carbon. Moreover the alkali (or alkaline earth) will facilitate establishment of equilibrium in the shift reaction $$CO + H_2O \longleftrightarrow CO_2 + H_2$$

and any hydrogen so formed will reduce nitrogen oxides. A combustion catalyst eg a supported precious metal, downstream of the alkalised ceramic foam filter, may be advantageous.

Instead of the active maerial being present merely as a layer on or in the surface of the ceramic foam support, in some cases it is possible to make the ceramic foam itself from the active material or a precursor thereto. For example the ceramic foam may be formed from iron oxide, eg magnetite, and used as an ammonia synthesis catalyst precursor (in which case the ceramic composition will generally also contain stabilisers such as alumina, and promoters such as lime, magnesia, and potash and may also contain cobalt oxide) or as a nitrile hydrogenation catalyst precursors (in which case the ceramic foam will generally also contain stabilisers such as alumina); on reduction of the iron oxide in the ceramic foam, the resultant sintered iron foam generally has sufficient strength and surface area to be of use as a catalyst in those applications. Another example is to make the foam from an iron oxide/chromia mixture; such a composition is of use as a high temperature shift catalyst precursor. Yet another example is to make the ceramic foam from zinc oxide in which case the resulting foam is itself of utility as an absorbent for sulphur compounds such as hydrogen sulphide. In yet a still further application the ceramic foam is a zeolite: in this case the foam ceramic may be a zeolite precursor material, eg kaolin, which is converted to zeolite after calcination, eg by treatment with an alkali.

Where the ceramic material is itself a catalyst or precursor, rather than merely a support for the active material, the ceramic material preferably comprises a major amount, ie at least 50% by weight, of oxides, of one or more metals selected from iron, cobalt, nickel, copper, vanadium, molybdenum, tungsten, chromium, manganese, and zinc, optionally with a minor amount, by weight, of oxides of one or more other metals (eg aluminium, calcium, barium, magnesium, zirconium, titanium, or alkali metals), or silicon, generally acting as stabilisers or promoters.

The invention is illustrated by the following examples.

EXAMPLE 1

Pellets in the form of cylinders of length 21.5 mm and diameter 23 mm were stamped from a sheet of open-celled polyurethane foam of density 0.029 g.cm$^{-3}$ and in which the maximum pore size was about 1.5 mm. There were at least 7 pores per linear cm.

A thixotropic aqueous alpha alumina slurry was made by dry mixing 100 parts by weight of alpha alumina having a particle size below 55 $\mu$m with about 1 part by weight of finely divided titania and then slowly adding about 40 parts by weight of an aqueous solution containing 1.5% by weight of polyvinyl alcohol of molecular weight 125000 and 0.01% by weight of DBX wetting agent to give a thick dispersion. The viscosity of the dispersion (measured using a Haake Rotovisco rotating vane viscometer at room temperature as described above) at a shear rate of 24 sec$^{-1}$ was 2200 cp while at a shear rate of 441 sec$^{-1}$ it was 100 cp. The aqueous solution of the polyvinyl alcohol and wetting agent has Newtonian flow characteristics and its viscosity (measured on a Brookfield rotating cylinder viscometer at 24° C.) was 5 cp measured over the shear rate range 7.5 to 75 sec$^{-1}$.

While stirring the slurry in a mixer, the polyurethane foam pellets were added and the resultant mixture kneaded for 5 minutes. The resultant impregnated foam pellets were then discharged from the mixer onto a tray having a mesh base. The tray was vibrated for 2 min. The impregnated pellets were then dried at about 70° C. for 24 hours and then heated to 1370° C. over a period of 24 hours and maintained at that temperature for 6 hours.

The resultant alpha alumina foam pellets had the following properties:
Length: 17 mm
Diameter: 17 mm
Volume shrinkage: 56%
Horizontal crushing strength: 260 kg
Apparent density: 1.43 g.cm$^{-3}$
Mercury density: 3.28 g.cm$^{-3}$
Helium density: 4.02 g.cm$^{-3}$
BET surface area: 0.20 m$^2$.g$^{-1}$
Micropore volume: 0.06 cm$^3$.g$^{-1}$
Total pore volume: 0.45 cm$^3$.g$^{-1}$
Total porosity: 64%
Megaporosity: 56%

The alumina foam pellets were then immersed in an aqueous solution containing 990 g.l$^{-1}$ nickel nitrate hexahydrate and 534 g.l$^{-1}$ aluminium nitrate nonahydrate for 15 minutes and then removed from the impregnating solution and allowed to drain for 1 hour. The impregnated pellets were then fired for 4 hours at 450°

C. The impregnation and firing procedure was repeated twice to give catalyst precursor pellets of the following composition by weight (after firing at 900° C.):

$Al_2O_3$: 88%
$TiO_2$: 1%
NiO: 11%

The resultant catalyst precursors were then treated for steam reforming activity by the following procedure:

A number of the impregnated foam pieces were charged to a laboratory steam reformer. The precursor was reduced to active catalyst by passing a mixture of natural gas, containing 91% v/v methane, and steam (steam: natural gas volume ratio 3:1) at a rate of 1000 liters per hour at atmospheric pressure through the reactor while the temperature of the latter was increased to about 760° C. over a period of 4 hours. The exit concentration of methane was monitored. The temperature was then maintained at about 760° C. and the gas stream replaced by a mixture of nitrogen and steam (steam: nitrogen volume ratio 3:1) at a rate of 1000 liters per hour for 16 hours. The reactor was then cooled to 450° C. The steam/nitrogen mixture was then replaced by the original natural gas/steam mixture and the temperature was again then increased to about 760° C. Finally the reactor was again cooled. The methane concentrations of the gas leaving the reactor at various temperatures are shown in the following table together with results obtained using a standard, commercial, steam reforming catalyst in the form of cylinders of 17 mm diameter, 17 mm length having a single through hole of diameter 7 mm and having a nickel oxide content of 10% by weight.

|  | Temperature (°C.) | Methane Content (%) | |
|---|---|---|---|
|  |  | Foam support | Standard |
| Initial heating | 500 | 90 | 90 |
|  | 550 | 5.0 | 31 |
|  | 600 | 3.3 | 14.5 |
|  | 650 | 1.5 | 8.3 |
|  | 700 | 0.4 | 5.2 |
|  | 760 | 0.15 | 3.2 |
| Second heating | 500 | 89 | 90 |
|  | 550 | 89 | 90 |
|  | 600 | 6.2 | 90 |
|  | 650 | 0.7 | 90 |
|  | 700 | 0.3 | 90 |
|  | 760 | 0.12 | 2.0 |
| Final Cooling | 700 | 0.4 | — |
|  | 650 | 1.3 | — |
|  | 600 | 3.4 | — |
|  | 550 | 8.0 | — |
|  | 500 | 14.5 | — |
|  | 450 | 25.0 | — |

This example shows that the catalyst has high activity and that the precursor is easily reduced to the active catalyst.

To assess the pressure drop characteristics of the catalyst precursor pellets, approximately 3 liters of the pellets were charged to a cylindrical vessel and the pressure drop experienced by a stream of air at atmospheric pressure (exit pressure) was determined using a water manometer at different air flow rates. The results are shown in the following table:

| Air flow rate ($l.s^{-1}$) | Pressure drop across bed (mm $H_2O$) | |
|---|---|---|
|  | Foam catalyst | Standard catalyst |
| 2 | 2.5 | 1 |
| 4 | 4.5 | 3.5 |
| 6 | 9 | 7 |
| 8 | 14.5 | 11 |
| 10 | 23 | 16 |
| 12.8 | 37 | 26.5 |

This demonstrates that the catalyst exhibits superior pressure drop characteristics compared to the standard catalyst. Measurement of the heat transfer coefficient showed that the foam catalyst pellets had a coefficient that was about 10% greater than that of the standard catalyst.

EXAMPLE 2

The procedure of Example 1 was repeated with the incorporation of 6.4 parts by weight of potassium carbonate into the alumina slurry. In this example the foam pieces employed were shorter so that the calcined pellets had a length of 10 mm. It was found that only two impregnations of the fired foam were necessary in order to achieve an adequate loading of nickel.

The properties of the foam support were as follows:
Length: 10 mm
Diameter: 17 mm
Volume shrinkage: 53%
Horizontal crushing strength: 115 kg
Apparent density: 1.13 $g.cm^{-3}$
Mercury density: 2.28 $g.cm^{-3}$
Helium density: 3.78 $g.cm^{-3}$
BET surface area: 0.69 $m^2.g^{-1}$
Total pore volume: 0.62 $cm^3.g^{-1}$
Micropore volume: 0.17 $cm^3.g^{-1}$
Total porosity: 70%
Megaporosity: 50%

The catalyst precursor pellets had the following composition (% by weight, after firing at 900° C.):
$Al_2O_3$: 84
$K_2O$: 2.7
$TiO_2$: 1
NiO: 12.3

The reforming activity of the alkalised foam support catalyst, together with that for a standard commercial alkalised steam reforming catalyst, is shown in the following table:

|  | Temperature (°C.) | Methane Content (%) | |
|---|---|---|---|
|  |  | Foam support | Standard |
| Initial heating | 462 | 90 | 91 |
|  | 542 | 90 | 91 |
|  | 627 | 89 | 90.5 |
|  | 697 | 1.6 | 88 |
|  | 750 | 0.5 | 18 |
|  | 763 | 0.3 | 3.4 |
| Second Heating | 509 | 90 | — |
|  | 632 | 89 | — |
|  | 682 | 3.5 | — |
|  | 714 | 1.8 | — |
|  | 762 | 0.55 | — |
| Final Cooling | 725 | 0.85 | — |
|  | 671 | 1.9 | — |
|  | 621 | 4.1 | — |
|  | 569 | 8.1 | — |
|  | 523 | 15.0 | — |
|  | 477 | 24.5 | — |
|  | 435 | 36.5 | — |

In another experiment, the stability of the foam supported catalyst was assessed by steam reforming methane at atmospheric pressure at an outlet temperature of about 760° C. and using a steam/methane molar ratio of 3:1. The test was conducted for over 2000 hours during which time the outlet methane concentration remained in the range 0.4 to 0.55% by volume (on a dry basis), except for a short period early in the duration of the experiment when it dropped to 0.25% by volume.

EXAMPLE 3

Pellets in the form of cylinders of length 10 mm and diameter 13 mm were stamped from a sheet of open-celled polyurethane foam of density 0.18 g.cm$^{-3}$ and in which the maximum pore size was about 1 mm. There were at least 10 pores per linear cm.

A thixotropic aqueous kaolin slurry was made by dry mixing 100 parts by weight of kaolin having a particle size below 100 μm with about 15 parts by weight of an aqueous solution containing about 5% by weight of polyvinyl alcohol. Then 95 parts by weight of deionized water was slowly added to give a thick dispersion.

The polyurethane foam pellets were added and the resultant impregnated mixture kneaded. The resultant impregnated foam pellets were then placed on a coarse sieve and shaken to remove the excess of the kaolin dispersion. The impregnated pellets were then dried at about 50° C. for 24 hours and then heated to 700° C. for 2 hours to burn out the polyurethane foam and convert the kaolin to meta-kaolin. After cooling the resultant porous meta-kaolin pellets were converted to Zeolite A by heating at 100° C. with a 10% by weight solution of sodium hydroxide. Samples of the pellets were removed from the alkali after various times and thoroughly washed in deionised water to remove any excess of alkali. The resultant pellets had the following characteristics:

| Time of immersion in alkali at 100° C. (hours) | Apparent density (g.cm$^{-3}$) | Crushing Strength (kg) |
| --- | --- | --- |
| 0 | 0.73 | 3.4 |
| 1 | 0.97 | 27.2 |
| 2 | 1.01 | 38.6 |
| 3 | 1.05 | 56.8 |
| 5 | 1.06 | 39.8 |

X-ray examination of the pellets after 3 hours immersion revealed that the pellet consisted of zeolite A in admixture with illite in the ratio of 2 parts by weight zeolite to 1 part illite. The pellets had a total porosity of 55% and a total pore volume of 0.45 cm$^3$.g$^{-1}$. The megaporosity was about 42%. The zeolite A pellets were of use as adsorbents eg for pressure swing adsorption.

EXAMPLE 4

In this example the polyurethane foam pieces employed were identical to those used in Example 3. 150 g of haematite of particle size below 50 μm was mixed with 15.5 g of aluminium nonahydrate, 14 ml of aqueous solution containing 220 g per liter of potassium nitrate, 45 ml of an aqueous solution containing 5% by weight of polyvinyl alcohol, and 135 ml of deionised water, to give a thick thixotropic dispersion. The pellets were impregnated with the slurry, drained, and dried as an Example 3 and then sintered by heating to 1300° C. at a rate of 100° C. per hour and maintaining the temperature of 1300° C. for 2 hours to give sintered iron oxide pellets A suitable for use as an ammonia synthesis catalyst precursor. The above procedure was repeated using 24.5 g of aluminium nonahydrate and 10 ml of the potassium nitrate solution to give pellets B of similar utility. The pellets A and B had the following properties:

| | Pellets | |
| Property | A | B |
| --- | --- | --- |
| Apparent density (g.cm$^{-3}$) | 2.78 | 1.98 |
| Volume shrinkage (%) | 78.8 | 79.3 |
| Horizontal crush strength (kg) | 47 | 29.5 |

The above procedure was repeated using a disc of the polyurethane foam of diameter about 15 cm and 25 mm thickness in place of the polyurethane foam pellets. The disc was impregnated with the haematite slurry by placing the disc on a vibrating tray and slowly pouring the slurry onto the surface of the disc. By this technique the sintered iron oxide ammonia synthesis catalyst precursor was prepared as a slab suitable for packing into a tubular synthesis reactor as a fixed, rather than particulate, bed.

EXAMPLE 5

The procedure of Example 4 was repeated using magnetite in place of haematite. The dried impregnated foam pieces were fired in air at 400° C. and then in argon at 1300° C. to sinter the magnetite. The product had the following properties:

Length: 10 mm
Diameter: 6.5 mm
Horizontal crushing strength: 49 kg
Apparent density: 2.02 g.cm$^{-3}$
Mercury density: 4.19 g.cm$^{-3}$
Helium density: 4.65 g.cm$^{-3}$
BET surface area: 0.19 m$^2$.g$^{-1}$
Total pore volume: 0.28 cm$^3$.g$^{-1}$
Micropore volume: 0.02 cm$^3$.g$^{-1}$
Total porosity: 57%
Megaporosity: 52%

EXAMPLE 6

Samples of cylindrical alpha alumina ceramic foam pellets of diameter 8 mm and length 8 mm, and of diameter 11.2 mm and length 13 mm, were made by the procedure of example 1, except that the plastics foam pieces were squeezed between rollers to expel alumina slurry before they were dried and fired. Sample A was fired at 1300° C. whereas sample B was fired at 1400° C. For comparison purposes a sample C, the same size as sample B, was prepared in the same way except that the plastics foam was not sqeezed to expel alumina slurry. The properties of the sintered products were as follows:

| | Sample | | |
| | A | B | C |
| --- | --- | --- | --- |
| length (mm) | 8.0 | 13.0 | 13.0 |
| diameter (mm) | 8.0 | 11.2 | 11.2 |
| HCS* (kg) | 1.4 | 11 | 230 |
| Apparent density (g.cm$^{-3}$) | 0.36 | 0.75 | 1.54 |
| Mercury density (g.cm$^{-3}$) | 3.07 | 3.30 | 3.38 |
| Helium density (g.cm$^{-3}$) | 3.96 | 3.97 | 3.98 |
| Total pore volume (cm$^3$.g$^{-1}$) | 2.52 | 1.08 | 0.40 |
| Micropore volume (cm$^3$.g$^{-1}$) | 0.07 | 0.05 | 0.05 |
| Total porosity (%) | 91 | 81 | 61 |
| Megaporosity (%) | 88 | 77 | 54 |

*horizontal crush strength

It is seen that the ceramic foams made in accordance with the invention contain more material and are much stronger than those made by processes giving a ceramic skeleton of the polyurethane foam. The latter have insufficient strength for use as supports in practical industrial catalytic applications.

EXAMPLE 7

In this example the use of the ceramic foams in accordance with the invention for carbon particle removal is demonstrated.

Alpha alumina foam pieces were prepared as described in Example 1 and, after calcination, were impregnated with aqueous solutions containing 100 g per liter of potassium carbonate. After impregnation the pieces were dried at 120° C. for 3 hours. To test the samples natural gas was saturated with toluene vapour and burnt in a deficiency of air so as to produce a smoky flame containing a large number of carbon particles. The test pieces were suspended in the soot forming region of the flame for 30 seconds, after which the test piece was suspended above a normal, fully combusted natural gas/air flame for 60 seconds and then the test piece was inverted and re-suspended above the normal flame for a further 60 seconds. The amount of carbon remaining on the test piece was assessed visually. For purposes of comparison, pieces that had not beem impregnated with alkali were similarly tested. Also tested were the pieces prepared as in Example 2 wherein the alkali was incorporated into the ceramic foam prior to calcination; these samples were tested with and without further impregnation with alkali.

The results were as follows:

| Sample | Observations |
| --- | --- |
| alkalised Example 1 | Ready deposition of soot with filtering of the smoky flame: only traces of soot left after burning in the normal flame. |
| un-alkalised Example 1 | Ready deposition of soot with filtering of the smoky flame: after burning off in the normal flame, soot removal was incomplete leaving localised carbon containing regions |
| un-alkalised Example 2 | Less soot deposited than in above cases: soot removal after burning in the normal flame incomplete. |
| alkalised Example 2 | Soot deposition as with un-alkalised sample soot removal after burning in normal flame virtually complete. |

Similar results were obtained when sodium carbonate was used in place of potassium carbonate. When the above procedure was repeated using pieces in the form of unalkalised, and alkali impregnated, alpha alumina rings of pore volume 0.19 $cm^3.g^{-1}$, and calcium aluminate rings of pore volume 0.28 $cm^3.g^{-1}$, similar results were obtained except that there was no filtering of the smoky flame and the degree of removal of the soot on burning off in the normal flame was less complete.

A 500 ml sample of test pieces that had been uniformly coated with soot by the above procedure was charged to an air oxidation unit comprising an electrically heated stainless steel reactor of diameter 50 mm through which air was passed at 25 $l.h^{-1}$. The heaters were adjusted to to increase the temperature of the exit gas to 600° C. over a period of 3 hours. During this period the exit gas was analysed for carbon monoxide and carbon dioxide by gas chromatography.

The results were as follows:

| Sample | Observations |
| --- | --- |
| unalkalised Example 1 | Carbon dioxide was evolved when the exit gas temperature reached 200° C. and attained a maximum concentration at a temperature of 300° C. No carbon monoxide was detected. |
| alkalised Example 1 | Carbon dioxide* was evolved from the sample at temperatures well below 200° C. and the carbon dioxide evolution was essentially complete when the temperature had reached 300° C. No carbon monoxide was detected. |
| calcium aluminate rings | Carbon dioxide started to be evolved when the temperature reached 300-350° C. The maximum carbon dioxide concentration was achieved when the exit temperature was about 500° C. No carbon monoxide was detected. |

*The amount of carbon dioxide referred to is significantly more than the carbon dioxide that is initially evolved, at relatively low temperatures, even if the sample has not been coated with soot - presumably as a result of a carbon dioxide releasing reaction of the alkali carbonate impregnant with the alumina.

EXAMPLE 8

500 g of finely powdered calcined alumina were mixed with 5 g of finely powdered titanium dioxide and then 250 ml of the polyvinyl alcohol/wetting agent solution as used in Example 1 were added. While the resultant dispersion was sheared, 500 ml of open cell polyurethane foam granules, prepared by "grinding" polyurethane foam pellets in a coffee mill for 2 minutes, were added and the resultant mixture sheared for 2 minutes. The impregnated foam granules were then discharged on to absorbent paper, allowed to dry in air for 24 hours, and then calcined in air at 1400° C. for 2 hours. The resulting ceramic foam granules were then sieved to obtain a 1 to 3 mm size fraction.

The sieved granules were then impregnated with a solution containing aluminium, nickel, and copper nitrates in such proportions that there were about 5 nickel atoms and 7 copper atoms to each aluminium atom. The impregnated granules were then heated in a furnace at 350° C. for 2 hours and then the temperature increased to 475° C. and held at that temperature for 3 hours. The impregnation and calcination procedure was then repeated. The resultant catalyst contained a total of about 10.5% by weight of copper oxide, nickel oxide, and alumina derived from the impregnating solution.

The catalyst was tested for hypochlorite decomposition activity by charging 100 ml of the catalyst granules to a reactor of 25 mm diameter immersed in an oil bath. An aqueous solution containing 1500 ppm by weight of sodium hypochlorite was passed through a preheater coil in the bath and then fed to the bottom of the reactor. The exit liquid from the reactor was analysed. This test procedure was repeated using different bath temperatures and liquid flow rates.

By way of comparison bauxilite chips were impregnated in a similar manner and tested. In order to obtain a comparable content of oxides derived from the impregnating solution, the chips were given three impregnation/calcination stages.

The results were as follows:

| Flow rate $(l.hr^{-1})$ | Temperature (°C.) | Exit NaOCl concentration (ppm) | |
| --- | --- | --- | --- |
| | | Foam granules | Chips |
| 4 | 40 | 285 | 305 |
| 5 | 50 | 130 | 140 |
| 6 | 60 | 70 | 40 |

We claim:

1. A steam reforming process wherein a hydrocarbon feedstock is reacted with steam and/or carbon dioxide in the presence of a catalyst comprising nickel and/or cobalt supported on shaped pieces of a silica-free ceramic foam having a network of irregular passages extending therethrough, said passages having an average minimum dimension in the range 20 to 300 μm, said foam having a total porosity in the range 40 to 85% and an apparent density of at least 0.7 g.cm$^{-3}$.

2. A process according to claim 1 wherein the silica free ceramic foam is a calcium aluminate or alpha alumina foam.

3. A process according to claim 1 wherein the process is effected at a pressure in the range 1 to 50 bar abs.

4. A process according to claim 1 wherein the outlet temperature is in the range 700° to 1100° C.

5. A process according to claim 1 wherein the heat required for the reaction is supplied from an external heat source.

6. A process according to claim 1 wherein the reforming process follows partial combustion with an oxygen-containing gas.

7. A process according to claim 1 wherein the ceramic foam has an apparent density of at least 1 g.cm$^{-3}$.

8. A process according to claim 7 wherein the ceramic foam has an apparent density in the range 1 to 2.5 g.cm$^{-3}$.

9. A process according to claim 1 wherein the ceramic foam has a megaporosity constituting 60 to 90% of the total porosity of the foam.

10. A process according to claim 1 wherein the ceramic foam has a total pore volume in the range 0.2 to 1.5 cm$^3$.g$^{-1}$.

* * * * *